Dec. 30, 1941.   H. A. JOHNSTON   2,267,925
FRACTURE SECURING APPARATUS
Filed Feb. 11, 1941
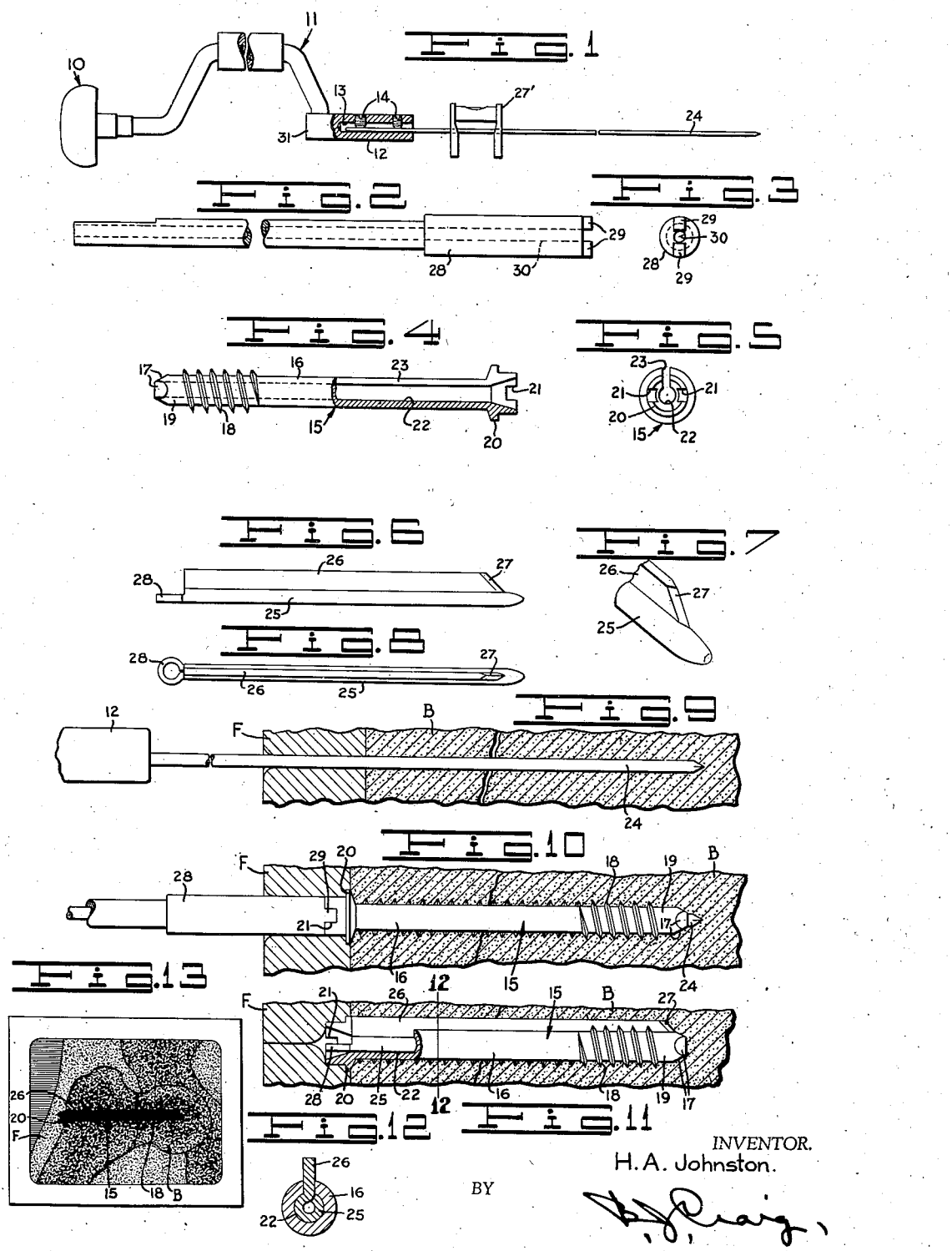
INVENTOR.
H. A. Johnston.

Patented Dec. 30, 1941

2,267,925

UNITED STATES PATENT OFFICE 2,267,925

FRACTURE SECURING APPARATUS

Herbert A. Johnston, Anaheim, Calif.

Application February 11, 1941, Serial No. 378,336

4 Claims. (Cl. 128—92)

This invention relates to novel fracture securing apparatus and to a novel method of fixing fractures.

The general object of the invention is to provide a novel mechanical means for securing together fractured bones, particularly a fractured hip bone.

Another object of the invention is to provide a novel method of securing together fractured bones.

A more specific object of the invention is to provide a novel hip screw.

An additional object of the invention is to provide a novel hip screw including a novel screw member together with improved means for holding the screw member in place.

Another object of the invention is to provide a novel apparatus for introducing and securing a hip screw in place.

An additional object of the invention is to provide a hip screw including novel means to prevent rotation of the parts of the bone relative to the screw after the latter is secured in place.

Other objects and advantages of the invention will be apparent from the following description taken in connection with the accompanying drawing wherein:

Fig. 1 is a side elevation, partly in section of the brace, drill rod and spirit level assembly.

Fig. 2 is a fragmentary enlarged side elevation of the screw driven member used in connection with the brace shown in Fig. 1.

Fig. 3 is an end view of the screw driven member shown in Fig. 2.

Fig. 4 is a side elevation, partly in section, of my improved hip screw.

Fig. 5 is an end view of the hip screw shown in Fig. 4.

Fig. 6 is a side elevation of the key member used in connection with the hip screw.

Fig. 7 is an enlarged fragmentary perspective view of the forward end of the key member shown in Fig. 6.

Fig. 8 is a top plan view of the key member shown in Fig. 6.

Fig. 9 is a section through a portion of a fractured bone and adjoining flesh and shows the drill rod inserted through the flesh and into the bone.

Fig. 10 is a view similar to Fig. 9 showing the hip screw being inserted into the bone.

Fig. 11 is a view similar to Fig. 10 showing the hip screw firmly rested in the bone with the key member in place.

Fig. 12 is an enlarged section through the hip screw and key member taken on line 12—12 of Fig. 11; and Fig. 13 is an illustration of an X-ray film showing the hip screw in position to repair a fracture of the hip bone.

Referring to the drawing by reference character I have indicated a fracture securing apparatus generally at 10. As shown the apparatus 10 includes a standard all metal brace 11 having a chuck portion 12 thereon which includes a recess 13 and securing screws 14.

In the accompanying drawing I have indicated my improved hip screw member generally at 15, which consists of an elongated cylindrical body 16 having a sharpened portion which is defined by inclined bevelled portion 17 at the front end. The body 16 includes a threaded portion 18 which is disposed at the forward end of the body and which terminates at a slight distance from the forward end so that a cylindrical portion 19 is disposed between the threads 18 and the bevelled faces 17. The rear end of the screw includes an enlarged head 20 in which I arrange a screw driver receiving slot 21.

The body 16 has a bore 22 which passes entirely therethrough and the bore is intersected by a slot 23 which opens to the exterior of the body 16.

The bore 22 is adapted to receive a rod 24 which may be engaged by the screws 14 to hold it in the brace. The bore 22 also may receive a bead 25 on a key member 26 which extends through the slot 23 and is shown as provided with a bevelled front portion 27. The rear end of the key includes an integral ring 28 which permits the key to be manipulated.

My device is particularly adapted for use for securing a fractured hip bone and is preferably employed in the following manner:

The position which the hip screw member 15 is to assume may be determined by X-ray or other means and the location for the point of entrance of the device may be suitably determined and indicated. The patient is preferably placed so that the securing member may enter horizontally and to aid in this I preferably employ a spirit level 27' which may be disposed on the rod 24 when the latter is being inserted.

A small puncture about one centimeter in diameter is made at the entrance point and thereafter the surgeon takes the brace 11 with the rod 24 secured in place by the screws 14 and slowly and with slight pressure advances the rod through the flesh E maintaining the device in a true horizontal plane by carefully watching the spirit level 27'.

As shown in Fig. 9 the rod 24 is inserted to the proper depth and then the screws 14 are released and the chuck withdrawn from the rod. The screw member 15 is then run on to the rod 24 with the rod in the bore 22 and the screw driver attachment 28 is secured in the brace. This screw driver attachment includes an elongated body having a screw engaging tongue 29 on the forward end and having a central bore 30 which receives the rod 24. The screw is then advanced by chest pressure upon the brace. The brace may be struck at the point 31 with a surgeon's mallet to start either the rod or the screw into the bone B.

The screws are made in various lengths to suit the requirements of each case and the screw is rotated by the brace until it is in the proper location. The threaded portion being only at the front end preferably when fully inserted engages the bone entirely at one side of the fracture and the head portion 20 of the screw engages the exterior of the bone on the other side of the fracture so that the parts are tightly pulled and clamped in the correct position as shown in Fig. 10.

After the hip screw 15 is secured, the rod 22 and screw driver are withdrawn and the key bead 25 is inserted in the bore of the body 16 and the key is advanced so that it enters the bone and prevents lateral shifting or relative rotation between the two parts of the bone along the axis of the screw. The ring 28 on the key permits removal of the key.

After the screw and key are secured in place, the skin puncture may be closed and the usual post-operative care carried out.

From the foregoing description it is apparent that I have invented a novel fracture securing apparatus which can be readily manufactured and secured in place and which is highly efficient for its intended purpose.

Having thus described my invention, I claim:

1. The method of securing a fracture, comprising aligning the fractured portions of a bone, advancing a rod through the fractured portions of the bone, arranging a hollow, slotted, externally threaded, headed member on the rod and threading the threaded member along the rod and into the bone portions which are to be secured, thereafter removing the rod and inserting a key in the hollow member, the key including a portion extending outwardly through the member slot and tending to prevent rotation of the bone portions relative to the member.

2. In a fracture securing device, an elongated body having threads thereon, said body having an axial bore adapted to receive a rod, said body having a slot therein communicating with the bore, and a key member slidable in said bore, said key member including a portion projecting outwardly through said slot.

3. In a fracture securing device, an elongated cylindrical body having a pointed end portion with threads thereon, said body having a head portion on the end remote from the pointed end portion, said body having an axial bore extending throughout its entire length and adapted to receive a rod, said body having a slot therein communicating with the bore, and a key member having a bead slidably fitting said bore, said key including a blade integral with the bead and projecting outwardly therefrom through said slot.

4. In a fracture securing device, an elongated cylindrical body having threads adjacent to one end, said cylindrical body extending beyond the threads and including a bevelled portion at the extreme end, said body having an enlarged cylindrical, unthreaded, head portion integral therewith on the end remote from said drill portion, said head portion having an end slot adapted to receive a screw driver, said body having an axial cylindrical bore throughout its entire length, said body having a radial slot therein communicating with the bore, said slot extending throughout the length of the body and a key member having a cylindrical bead slidably fitting said bore, said key including a blade integral with the bead and extending outwardly therefrom and projecting through said slot, said key having a pointed front end and a ring on the rear end of said key.

HERBERT A. JOHNSTON.